(12) United States Patent
Huang et al.

(10) Patent No.: US 9,008,459 B2
(45) Date of Patent: Apr. 14, 2015

(54) GLOBAL SPATIAL DOMAIN DETAIL CONTROLLING METHOD

(71) Applicant: NOVATEK Microelectronics Corp., Hsin-Chu (TW)

(72) Inventors: Ming-Teng Huang, Hsinchu (TW); Wei Hsu, Taoyuan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 111 days.

(21) Appl. No.: 13/911,092

(22) Filed: Jun. 6, 2013

(65) Prior Publication Data
US 2014/0321740 A1    Oct. 30, 2014

(30) Foreign Application Priority Data

Apr. 25, 2013    (TW) .............................. 102114885 A (51) Int. Cl.
*G06K 9/40* (2006.01)
*G06T 5/00* (2006.01)

(52) U.S. Cl.
CPC ....... *G06T 5/003* (2013.01); *G06T 2207/20008* (2013.01)

(58) Field of Classification Search
CPC ......... G06K 9/42; G06K 9/58; G06K 9/6226; G06K 9/6298; G06K 9/748; H04N 9/045; H04N 19/00066; H04N 19/00145; H04N 19/00151; H04N 19/00278; H04N 19/00484; H04N 19/00503; H04N 19/00781; H04N 19/00903; G06T 1/0007; G06T 3/4015; G06T 7/0085; G06T 7/408; G06T 11/006; G06T 11/008; G06T 15/08; G06T 2207/20016; G06T 2207/20048; G06T 2211/412; G06T 2211/421; G06T 2211/424; G06T 2211/428
See application file for complete search history.

(56) References Cited

U.S. PATENT DOCUMENTS

| | | | |
|---|---|---|---|
| 6,114,852 A * | 9/2000 | Zhou et al. ..................... | 324/306 |
| 7,027,643 B2 * | 4/2006 | Comaniciu et al. ............ | 382/162 |
| 7,511,495 B2 * | 3/2009 | Kholmovski et al. ......... | 324/310 |
| 8,761,504 B2 * | 6/2014 | Hirakawa et al. ............. | 382/167 |

* cited by examiner

*Primary Examiner* — Jose Couso
(74) *Attorney, Agent, or Firm* — Winston Hsu; Scott Margo (57) ABSTRACT

A global spatial domain detail controlling method for an image processor includes adjusting at least one detail parameter corresponding to each pixel during an image processing according to each space position of the each pixel in an image; and performing the each pixel with the image processing according to the at least one detail parameter of the each pixel.

10 Claims, 8 Drawing Sheets

GLOBAL SPATIAL DOMAIN DETAIL CONTROLLING METHOD

BACKGROUND OF THE INVENTION

1. Field of the Invention

The present invention relates to a global spatial domain detail controlling method, and more particularly, to a global spatial domain detail controlling method capable of adjusting corresponding detail parameters for image processing according to space position of each pixel in an image, so as to process a center portion and a corner portion of the image separately, wherein the corner portion of the image may exhibit larger noise due to lack of illumination.

2. Description of the Prior Art

In general, an image sensor is designed toward less area, more pixels and smaller pixels. However, when the image sensor is used with a lens, a corner portion of the image may be obscured by the lens, which causes lens shading and leads to even less illumination such that the captured image exhibits larger noise in corner portions (i.e. lens shading usually attenuates with multiple functions, and SNR attenuates along with lens shading).

In such a condition, a conventional image processor usually does not take spatial factors into consideration when performing image processing manners such as noise reduction control, sharpness control, color saturation control and color interpolation control, and may sacrifice the image quality of the center portion in order to take the image quality of the corner portions into account.

Figure 1:
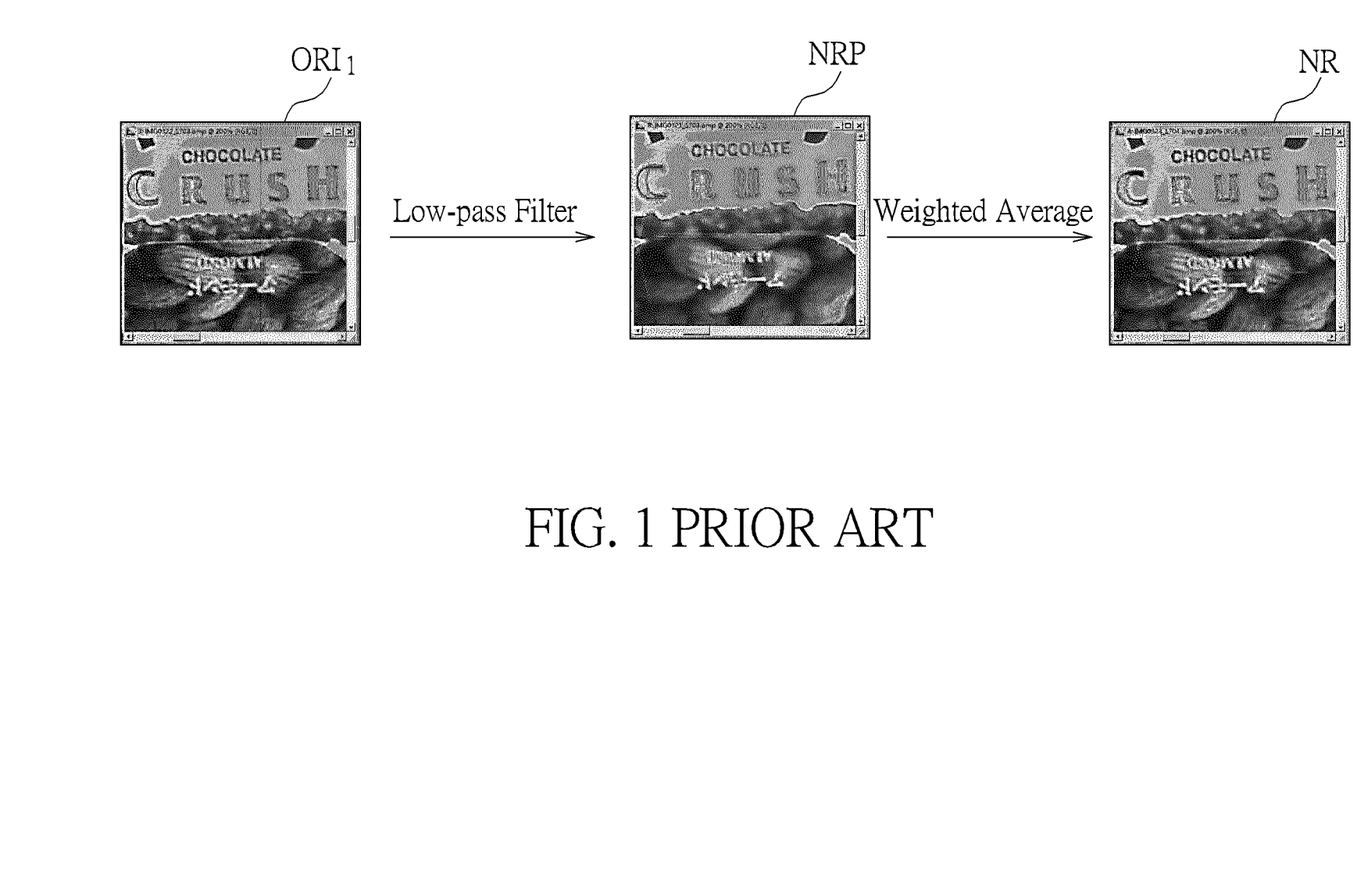
FIG. 1 is a schematic diagram of noise reduction control performed by a conventional image processor.

For example, please refer to FIG. 1, which is a schematic diagram of noise reduction control performed by a conventional image processor. As shown in FIG. 1, when performing noise reduction control, the conventional image processor generates a noise reduction prediction image NRP by low-pass filtering an original image $ORI_1$ (i.e. taking a weighted average to each pixel with surrounding pixels thereof for generating a new pixel value), and then generates a noise reduction image NR from a weighted average of the original image $ORI_{1\_}$ and the noise reduction prediction image NRP with a specific weighting factor W (i.e. $NR=(1-W)*ORI_1+W*NRP$). Since a single specific weighting factor W is used for all pixels in the entire image, the weighting factor of the noise reduction prediction image NRP is increased in order to reduce noise for the corner portion of the noise reduction image NR, which however may blur the center portion of the noise reduction image NR.

Figure 2:
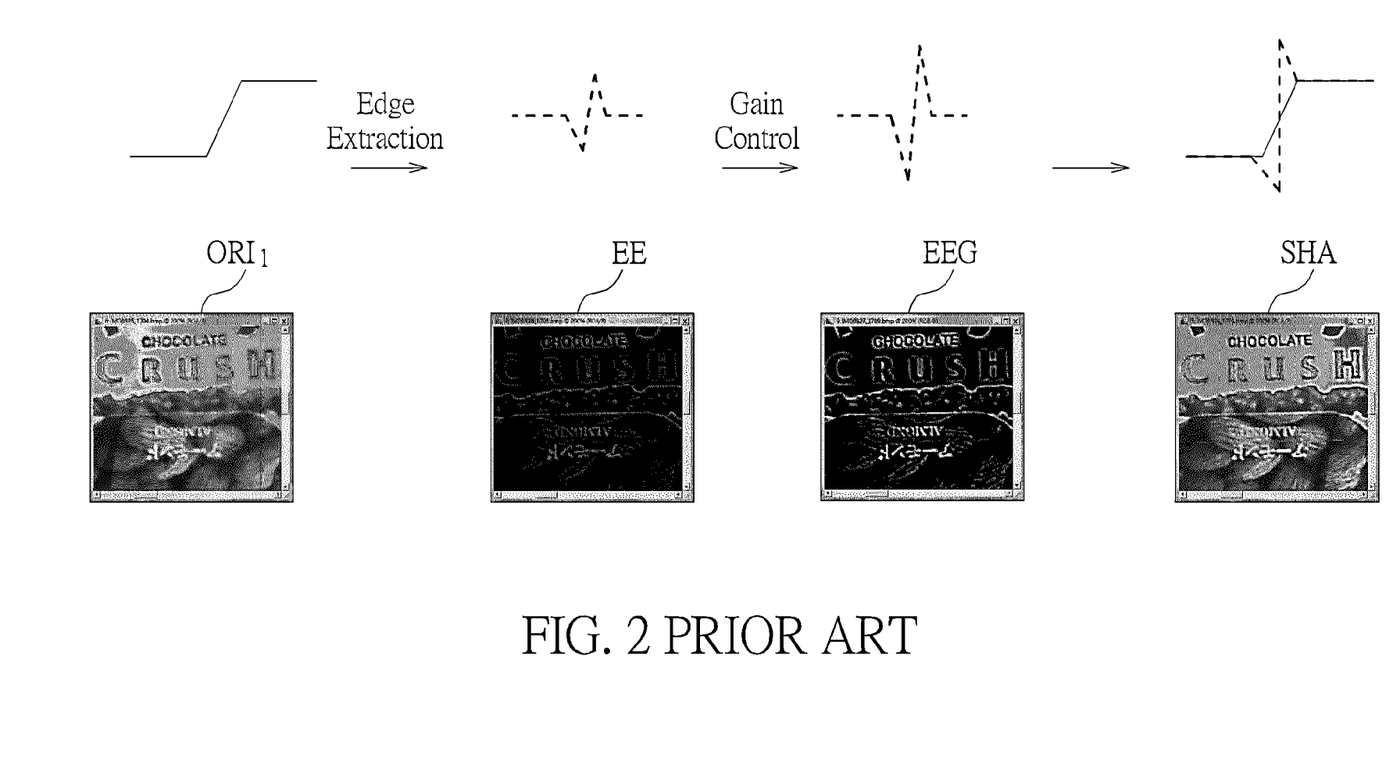
FIG. 2 is a schematic diagram of sharpness control performed by the conventional image processor.

Besides, please refer to FIG. 2, which is a schematic diagram of sharpness control performed by the conventional image processor. As shown in FIG. 2, when performing sharpness control, the conventional image processor generates an edge extraction image EE by extracting edges in the original image $ORI_1$ (i.e. taking a pixel value difference between each pixel and a front or rear pixel thereof in a specific direction so that the pixel value difference becomes plus or minus near an edge due to an decrease or increase of the pixel value of the front or rear pixel), and then generates an edge extraction gain image EEG by enlarging the pixel value difference in the edge extraction image EE with an edge gain. Finally, the conventional image processor sums up the original image $ORI_1$ with the edge extraction gain image EEG to obtain a sharpened image SHA in order to strengthen pixel value differences at the edges for sharpness control. Since the pixel value differences in the entire image are enlarged with the same edge gain, the edge gain is increased in order to sufficiently sharpen the corner portion of the sharpened image SHA for noise reduction, which however, may over-sharpen the center portion of the sharpened image SHA and thereby distort the image.

Figure 3:
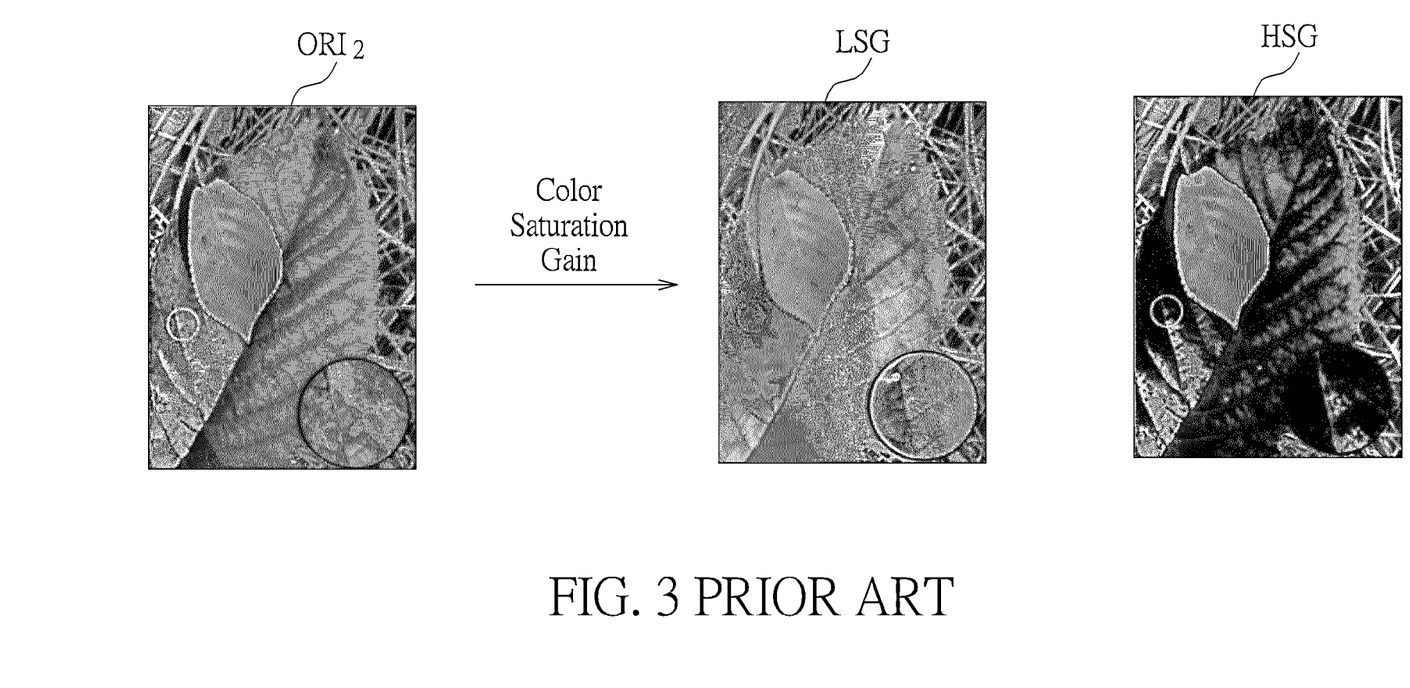
FIG. 3 is a schematic diagram of color saturation control performed by the conventional image processor.

Moreover, please refer to FIG. 3, which is a schematic diagram of color saturation control performed by the conventional image processor. As shown in FIG. 3, when performing color saturation control, the conventional image processor adjusts the color saturation of the original image $ORI_2$. For example, when decreasing a color saturation gain to generate a low color saturation image LSG, the image texture is clear at the lower right of the low color saturation image LSG but the image color is worse, and when increasing a color saturation gain to generate a high color saturation image HSG, the image color of the high color saturation image HSG is better but the image texture at the lower right is not clear (because the noise is too high in the corner portion to determine the color correctly). Since the entire image is controlled by the same color saturation gain, the color saturation gain is decreased in order to make the image texture of the corner portion clear, which however, may worsen the image color of the center portion and thereby distort the image.

Figure 4:
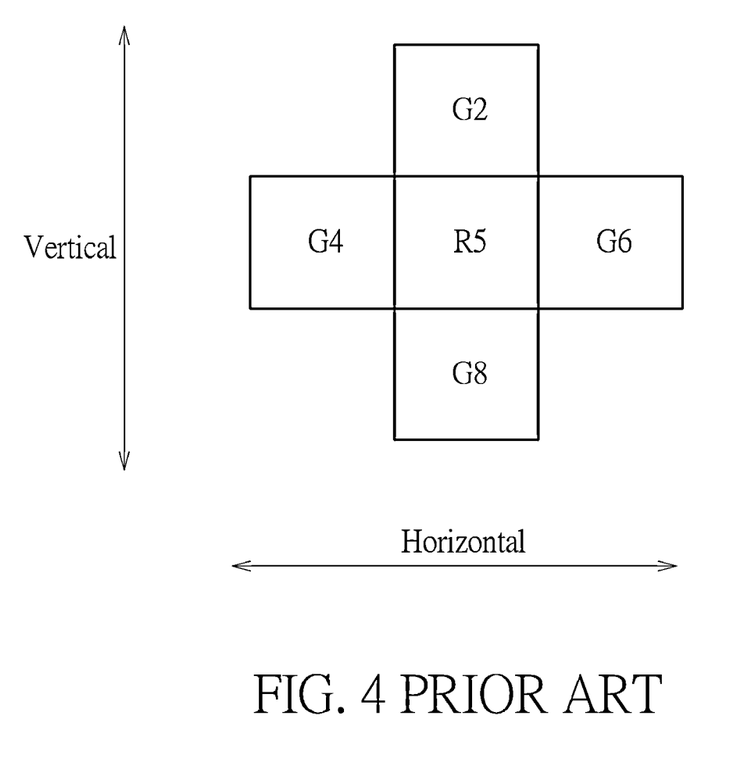
FIG. 4 is a schematic diagram of color interpolation control performed by the conventional image processor.

In addition, please refer to FIG. 4, which is a schematic diagram of color interpolation control performed by the conventional image processor. As shown in FIG. 4, the conventional image processor simplifies the image with a Bayer Pattern. Each pixel only has a primary color data, and requires obtaining the other two primary colors by interpolation. Therefore, when the conventional image processor performs color interpolation control to obtain a green pixel value G5 at a position only having a red pixel value R5 by interpolating green pixel values G2, G4, G6, G8 at the surroundings, the conventional image processor obtains a horizontal pixel value difference dH and a vertical pixel value difference dV (i.e. $dV=|G2-G8|$ and $dH=|G4-G6|$), and then compares the horizontal pixel value difference dH and the vertical pixel value difference dV with a color interpolation threshold CIT. If the horizontal pixel value difference dH is larger than the color interpolation threshold CIT and the vertical pixel value difference dV is smaller than the color interpolation threshold CIT, the conventional image processor determines that the interpolation is performed in the vertical direction (i.e. $G5=(G2+G8)/2$), if the horizontal pixel value difference dH is smaller than the color interpolation threshold CIT and the vertical pixel value difference dV is larger than the color interpolation threshold CIT, the conventional image processor determines that the interpolation is performed in the horizontal direction (i.e. $G5=(G4+G6)/2$), and if the horizontal pixel value difference dH is smaller than the color interpolation threshold CIT and the vertical pixel value difference dV is smaller than the color interpolation threshold CIT, the conventional image processor determines that the interpolation is performed as no particular direction (i.e. $G5=(G2+G4+G6+G8)/4$). Since the entire image is controlled by the same color interpolation threshold CIT, the color interpolation threshold CIT is increased in order to prevent the corner portion from an incorrect determination of the direction due to noise (i.e. when the noise is larger, the interpolation directions are randomly determined as vertical or horizontal direction in an area so that a maze texture may be formed), which however, may not clearly determine the direction for the center portion of the image.

From the above, when performing image processing manners such as noise reduction control, sharpness control, color saturation control and color interpolation control, the conventional image processor usually does not take spatial factors into consideration and uses the same detail parameters for processing the entire image. Therefore, the image quality of the center portion may be sacrificed in order to take the image quality of the corner portions into account. Thus, there is a need for improvement of the prior art.

SUMMARY OF THE INVENTION

It is therefore an objective of the present invention to provide a global spatial domain detail controlling method capable of adjusting corresponding detail parameters for image processing according to space position of each pixel in an image, so as to process a center portion and a corner of the image separately, wherein the corner portion of the image may exhibit larger noise due to lack of illumination.

The present invention discloses a global spatial domain detail controlling method for an image processor. The global spatial domain detail controlling method includes adjusting at least one detail parameter corresponding to each pixel during an image processing according to each space position of the each pixel in an image; and performing the each pixel with the image processing according to the at least one detail parameter of the each pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
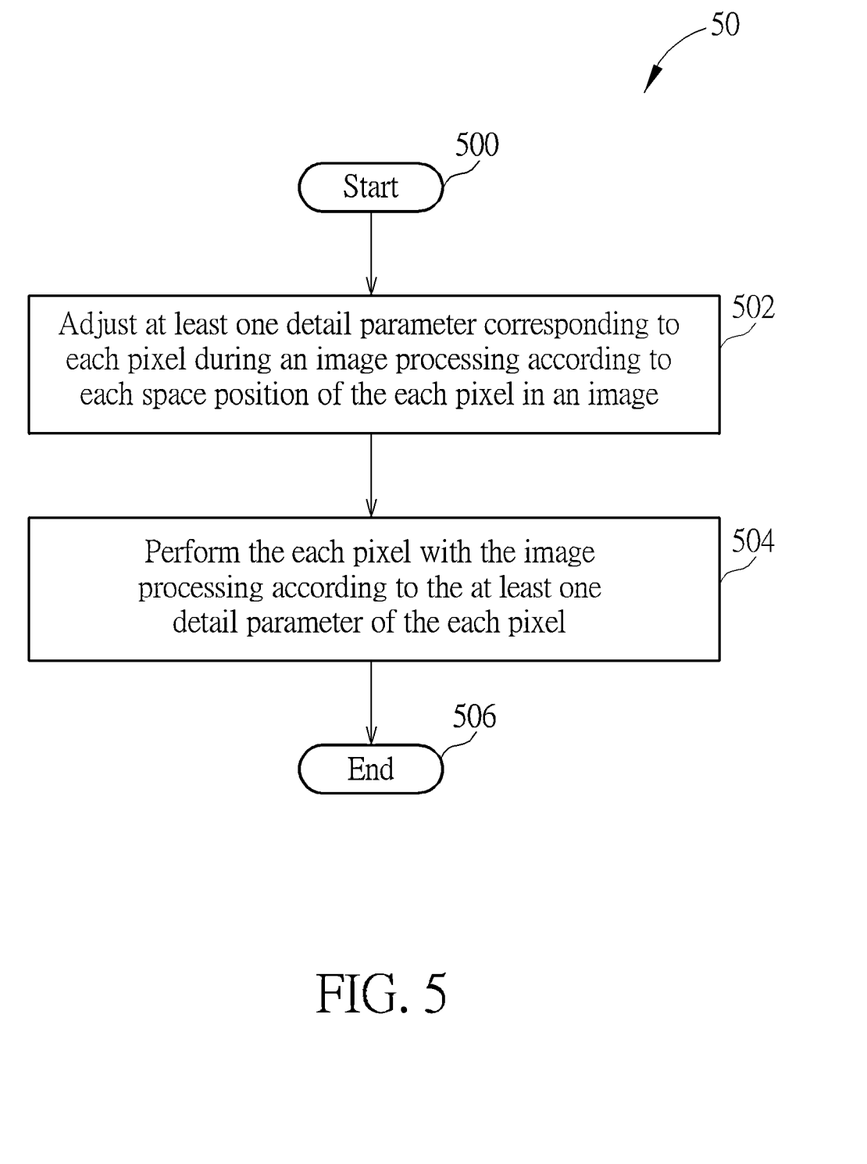
FIG. 5 is a flow chart of a global spatial domain detail controlling process according to an embodiment of the present invention.

Please refer to FIG. 5, which is a flow chart of a global spatial domain detail controlling process 50 according to an embodiment of the present invention. As shown in FIG. 5, the global spatial domain detail controlling process 50 for an image processor includes the following steps:

Step 500: Start.

Step 502: Adjust at least one detail parameter corresponding to each pixel during an image processing according to each space position of the each pixel in an image.

Step 504: Perform the each pixel with the image processing according to the at least one detail parameter of the each pixel.

Step 506: End.

According to the global spatial domain detail controlling process 50, the present invention adjusts at least one detail parameter corresponding to each pixel during an image processing according to each space position of the each pixel in an image, and then performs the each pixel with the image processing according to the at least one detail parameter of the each pixel. In such a situation, since pixels in different space positions of the image are processes by different detail parameters, pixels in a center of the image and pixels in a corner of the image can be separately configured with appropriate detail parameters. As a result, the present invention may adjust the corresponding detail parameters for image processing according to space position of each pixel in the image, so as to process the center portion and the corner portion of the image separately, wherein the corner portion of the image may exhibit larger noise due to lack of illumination.

Figure 6:
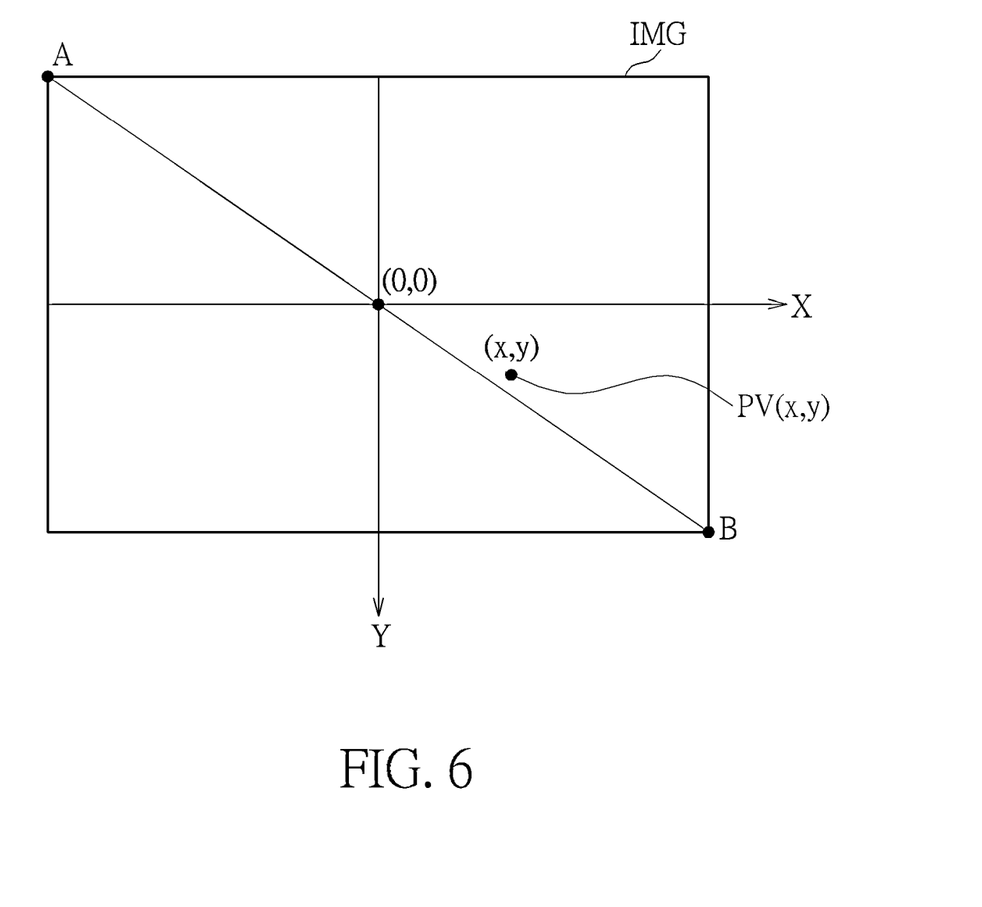
FIG. 6 is a schematic diagram of a space position of an image according to an embodiment of the present invention.

In detail, please refer to FIG. 6, which is a schematic diagram of a space position (x,y) of an image IMG according to an embodiment of the present invention. As shown in FIG. 6, a center of the image IMG is set as the origin (0,0) of the coordinates, and a spatial value $PV_{(x,y)}$ corresponding to the space position (x,y) is expressed as a bivariate polynomial as below:

$$PV_{(x,y)} = [(a_n x^n + a_{n-1} x^{n-1} + \ldots + a_1 x + a_0) + (b_n y^n + b_{n-1} y^{n-1} + \ldots + b_1 y + b_0)]^{1/m}$$

In such a condition, the present invention may obtain the specific spatial value $PV_{(x,y)}$ according to the specific space position (x,y), and then adjust detail parameters according to the specific spatial value $PV_{(x,y)}$. Since the spatial value $PV_{(x,y)}$ is a bivariate polynomial, a distribution condition of the spatial value $PV_{(x,y)}$ may be designed according to practical requirements of image processing manners such as noise reduction control, sharpness control, color saturation control, color interpolation control and the space position (x,y) (e.g. to increase or decrease the spatial value $PV_{(x,y)}$ in a straight, curve or stepped manner according to a distance from the center in order to match attenuation of signal to noise ratio due to lens shading that attenuates with multiple functions). As a result, the present invention may be realized by a multiplier and an adder. Also, with fewer coefficients, the present invention can effectively reduce required memory space, and it is easy to be integrated into various types of image processing manners and various platforms for computation.

For example, when noise reduction control is performed for the image processing, the detail parameter that is adjusted may be a noise reduction prediction image weighting $NRW_{(x,y)}$ and an original image weighting $(1-NRW_{(x,y)})$. Therefore, the noise reduction control can be performed on each pixel after obtaining the noise reduction prediction image weighting $NRW_{(x,y)}$ and the original image weighting $(1-NRW_{(x,y)})$ corresponding to each pixel according to the spatial value $PV_{(x,y)}$, a global noise reduction prediction image weighting GNRW and a noise reduction normalization value NRNF corresponding to the noise reduction control. That is, $$PNR_{(x,y)} = ORIP_{(x,y)} * (1-NRW_{(x,y)}) + NRP_{(x,y)} * NRW_{(x,y)}$$

$$NRW_{(x,y)} = GNRW \, OP \, PV_{(x,y)} * NRNF$$

where $PNR_{(x,y)}$ is the pixel value of each pixel obtained after performing noise reduction control according to an embodiment of the present invention, $ORIP_{(x,y)}$ is the pixel value of each pixel in the original image, $NRP_{(x,y)}$ is the pixel value of each pixel in the noise reduction prediction image generated by low-pass filtering, and OP represents an operator for the operands of GNRW and $PV_{(x,y)} * NRNF$, and may be any operator such as addition, subtraction, multiplication and division. Noticeably, in the above embodiment, the noise reduction prediction image weighting is $NRW_{(x,y)}$ while the original image weighting is $(1-NRW_{(x,y)})$, but in other embodiment, the noise reduction prediction image weighting can be $(1-ORW_{(x,y)})$ while the original image weighting can be $ORW_{(x,y)}$.

Figure 7A:
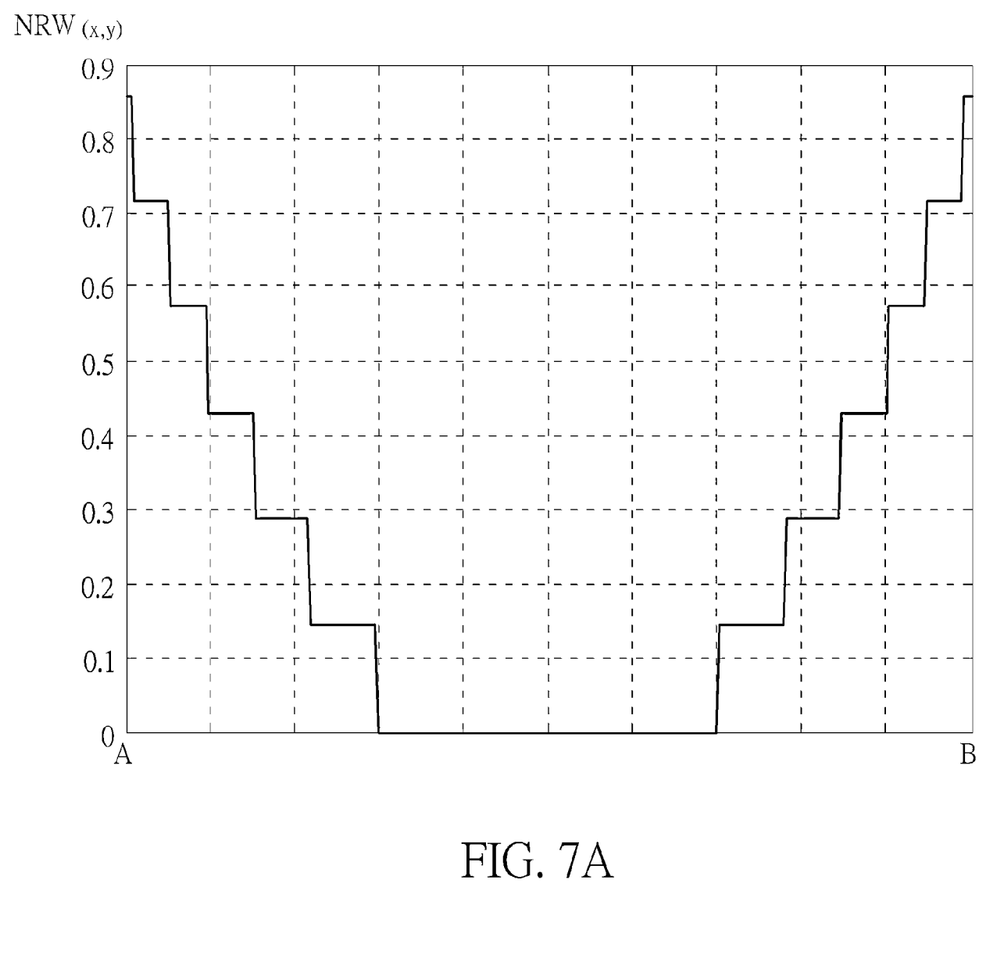
FIG. 7A is a schematic diagram of distribution of a noise reduction prediction image weighting in the image shown in FIG. 6.

In such a situation, please refer to FIG. 7A, which is a schematic diagram of distribution of a noise reduction prediction image weighting $NRW_{(x,y)}$ in the image IMG. As shown in FIG. 6 and FIG. 7A, the distribution of the noise reduction prediction image weighting $NRW_{(x,y)}$ from a point A to a point B in FIG. 6 in the image IMG is as shown in FIG. 7A. The noise reduction prediction image weighting $NRW_{(x,y)}$ is increased in a stepped manner (or may be increased in a straight or curve manner in other embodiments) according to a distance from the center. As a result, if a pixel $P_{(x,y)}$ is located in the center of the image IMG, the corresponding original image weighting $(1-NRW_{(x,y)})$ may be increased and the corresponding noise reduction prediction image weighting $NRW_{(x,y)}$ may be decreased (e.g. to 0), and if the pixel $P_{(x,y)}$ is located in the corner of the image IMG, the corresponding original image weighting $(1-NRW_{(x,y)})$ may be decreased and the corresponding noise reduction prediction image weighting $NRW_{(x,y)}$ may be increased (e.g. to 0.85). Therefore, the center portion of the image may maintain clear, and the larger noise which caused from lack of illumination in the corner portion of the image may be reduced.

On the other hand, when sharpness control is performed for the image processing, the detail parameter that is adjusted may be an edge gain $EG_{(x,y)}$. Therefore, the sharpness control can be performed on each pixel after obtaining the edge gain $EG_{(x,y)}$ of each pixel according to the spatial value $PV_{(x,y)}$, a global edge gain GEG and a sharpness normalization value ENF of the corresponding sharpness control. That is, $$PE_{(x,y)}=ORIP_{(x,y)}+EV*EG_{(x,y)}$$

$$EG_{(x,y)}=GEG\ OP\ PV_{(x,y)}*ENF,$$

where $PE_{(x,y)}$ is the pixel value of each pixel obtained after performing sharpness control according to an embodiment of the present invention, $ORIP_{(x,y)}$ is the pixel value of each pixel in the original image, EV is an edge value obtained by performing edge extraction (i.e. the pixel value difference of the edge extraction image EE shown in FIG. 2), and OP represents an operator for the operands of GEG and $PV_{(x,y)}*ENF$, and may be any operator such as addition, subtraction, multiplication and division.

Figure 7B:
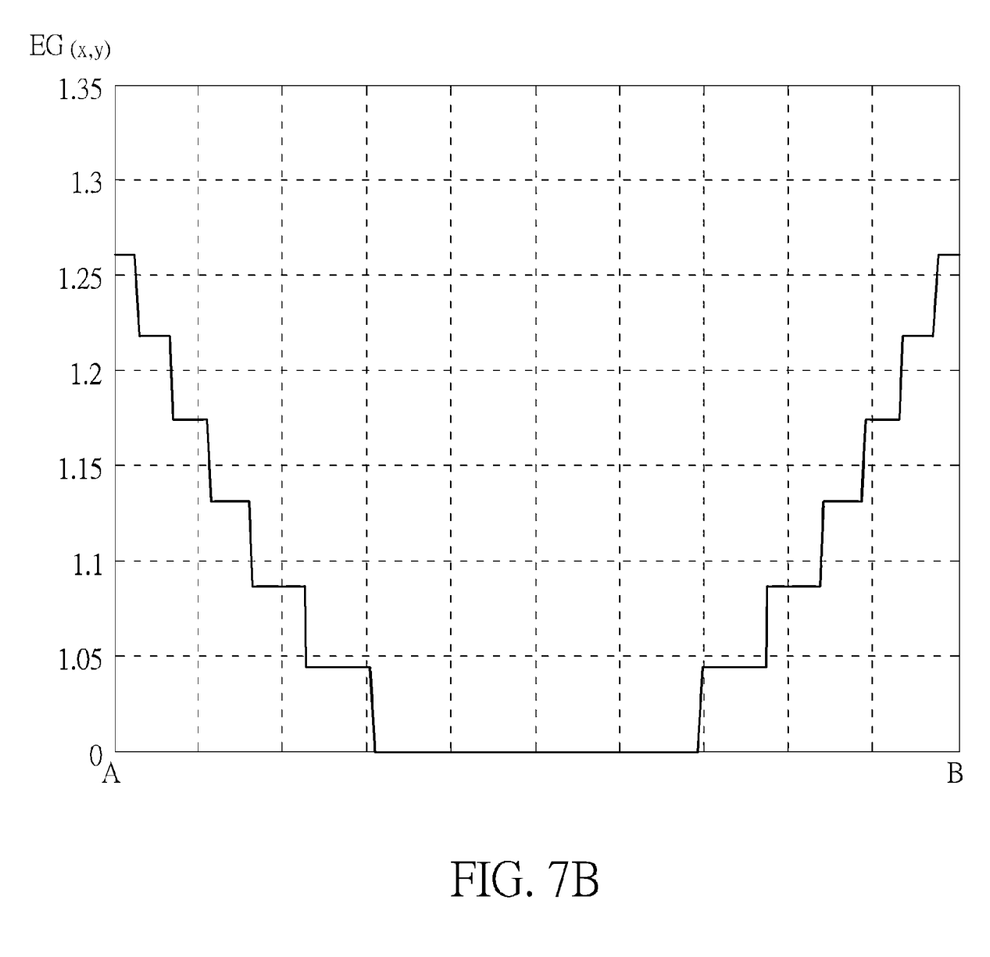
FIG. 7B is a schematic diagram of distribution of an edge gain in the image shown in FIG. 6.

In such a situation, please refer to FIG. 7B, which is a schematic diagram of distribution of the edge gain $EG_{(x,y)}$ in the image IMG. As shown in FIG. 6 and FIG. 7B, the distribution of the edge gain $EG_{(x,y)}$ from the point A to the point B in FIG. 6 in the image IMG is as shown in FIG. 7B. The edge gain $EG_{(x,y)}$ is increased in a stepped manner (or may be increased in a straight or curve manner in other embodiments) according to a distance from the center. As a result, if the pixel $P_{(x,y)}$ is located in the center of the image IMG, the corresponding edge gain $EG_{(x,y)}$ may be decreased (e.g. to 1), and if the pixel $P_{(x,y)}$ is located in the corner of the image IMG, the corresponding edge gain $EG_{(x,y)}$ may be increased (e.g. to 1.256). Therefore, the center portion of the image may maintain undistorted, and the sharpness of the corner portion of the image may be increased to overcome blurring.

On the other hand, when color saturation control is performed for the image processing, the detail parameter that is adjusted may be a color saturation gain $CSG_{(x,y)}$. Therefore, the color saturation control can be performed on each pixel after obtaining the color saturation gain $CSG_{(x,y)}$ of each pixel according to the spatial value $PV_{(x,y)}$, a global color saturation gain GCSG and a saturation normalization value CSNF of the corresponding color saturation control. That is, $$PCS_{(x,y)}=ORIP_{(x,y)}*CSG_{(x,y)}$$

$$CSG_{(x,y)}=GCSG\ OP\ PV_{(x,y)}*CSNF,$$

where $PCS_{(x,y)}$ is the pixel value of each pixel obtained after performing color saturation control according to an embodiment of the present invention, $ORIP_{(x,y)}$ is the pixel value of each pixel in the original image, and OP represents an operator for the operands of GCSG and $PV_{(x,y)}*CSNF$, and may be any operator such as addition, subtraction, multiplication and division.

As a result, if the pixel $P_{(x,y)}$ is located in the center of the image IMG, the corresponding color saturation gain $CSG_{(x,y)}$ may be increased, and if the pixel $P_{(x,y)}$ is located in the corner of the image IMG, the corresponding color saturation gain $CSG_{(x,y)}$ may be decreased. Therefore, the color saturation of the center portion of the image may be enhanced, and the corner portion of the image may be prevented from distortion due to noise.

On the other hand, when color interpolation control is performed for the image processing, the detail parameter that is adjusted may be a color interpolation threshold $CIT_{(x,y)}$. Therefore, the color interpolation control can be performed on each pixel after obtaining the color interpolation threshold $CIT_{(x,y)}$ of each pixel according to the spatial value $PV_{(x,y)}$, a global color interpolation threshold GCIT and a color interpolation normalization value CINF of the corresponding color interpolation control. That is, $$PCI_{(x,y)}=INT(NP_{(x,y)},CIT_{(x,y)})$$

$$CIT_{(x,y)}=GCIT\ OP\ PV_{(x,y)}*CINF,$$

where $PCI_{(x,y)}$ is the pixel value of each pixel obtained after performing color interpolation control according to an embodiment of the present invention, $NP_{(x,y)}$ represents the pixel value of the surrounding pixels which are used for interpolation for a certain pixel in the original image (e.g. when color interpolation control is required for obtaining the green pixel value G5 in FIG. 4, $NP_{(x,y)}$ represents the green pixel values G2, G4, G6, G8), and OP represents an operator for the operands of GCIT and $PV_{(x,y)}*CINF$, and may be any operator such as addition, subtraction, multiplication and division.

As a result, if the pixel $P_{(x,y)}$ is located in the center of the image IMG, the corresponding color interpolation threshold $CIT_{(x,y)}$ may be decreased, and if the pixel $P_{(x,y)}$ is located in the corner of the image IMG, the corresponding color interpolation threshold $CIT_{(x,y)}$ may be increased. Therefore, the direction may be correctly determined for the center portion of the image and thereby enhance color interpolation correctness, and the pixel values of the surrounding pixels of the pixel $P_{(x,y)}$ may be averaged in the corner portion of the image in order to prevent from incorrect color interpolation due to noise.

Noticeably, the above embodiments adjusts the corresponding detail parameters for image processing according to space position of each pixel in an image, so as to process a center portion and a corner portion of the image separately, wherein the corner portion of the image may exhibit larger noise due to lack of illumination, and those skilled in the art can make alterations and modifications accordingly. For example, the image processing may follow the sequence from noise reduction control, color interpolation control, sharpness control to color saturation control. However, other image processing manners may be added or the sequence may be changed according to practical requirements. Besides, the image processing manners such as noise reduction control, color interpolation control, sharpness control and color saturation control may be performed in combination or implemented separately or combined partially to achieve individual effect of related image processing manners. Moreover, the method of adjusting the noise reduction prediction image weighting $NRW_{(x,y)}$, the edge gain $EG_{(x,y)}$, the color saturation gain $CSG_{(x,y)}$ and the color interpolation threshold $CIT_{(x,y)}$ for the center portion and the corner portion of the image in the noise reduction control, the color interpolation control, the sharpness control and the color saturation control mentioned above is utilized to overcome the problem that the corner portion of the image may exhibit larger noise due to lack of illumination, but in other embodiments the adjusting method may be different to comply with practical requirements.

In the prior art, when performing image processing manners such as noise reduction control, sharpness control, color saturation control and color interpolation control, the conventional image processor usually does not take spatial factors into consideration and uses the same detail parameters for processing the entire image. Therefore, the image quality of the center portion may be sacrificed in order to take the image quality of the corner portions into account. In comparison, the present invention is capable of adjusting corresponding detail parameters for image processing according to space position of each pixel in an image, so as to process a center portion and a corner portion of the image separately, wherein the corner portion of the image may exhibit larger noise due to lack of illumination.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A global spatial domain detail controlling method for an image processor, comprising:
    the image processor adjusting at least one detail parameter corresponding to each pixel during an image processing positive-correlatively or negative-correlatively according to a distance from each space position of the each pixel in an image to a center of the image; and
    the image processor performing the each pixel with the image processing according to the at least one detail parameter of the each pixel.

2. The global spatial domain detail controlling method of claim 1, wherein a spatial value corresponding to the each space position is expressed as a bivariate polynomial.

3. The global spatial domain detail controlling method of claim 1, wherein the image processing comprises a noise reduction control, and the at least one detail parameter comprises an original image weighting and a noise reduction prediction image weighting.

4. The global spatial domain detail controlling method of claim 3, wherein the step of the image processor adjusting the at least one detail parameter corresponding to the each pixel during the image processing positive-correlatively or negative-correlatively according to the distance from the each space position of the each pixel in the image to the center of the image comprises:
    the image processor increasing a corresponding first original image weighting and decreasing a corresponding first noise reduction prediction image weighting if a first pixel is in a center of the image, and decreasing a corresponding second original image weighting and increasing a corresponding second noise reduction prediction image weighting if a second pixel is in a corner of the image.

5. The global spatial domain detail controlling method of claim 1, wherein the image processing comprises a sharpness control, and the at least detail parameter comprises an edge gain.

6. The global spatial domain detail controlling method of claim 5, wherein the step of the image processor adjusting the at least one detail parameter corresponding to the each pixel during the image processing positive-correlatively or negative-correlatively according to the distance from the each space position of the each pixel in the image to the center of the image comprises:
    the image processor decreasing a corresponding first edge gain if a first pixel is in a center of the image, and increasing a corresponding second edge gain if a second pixel is a corner of the image.

7. The global spatial domain detail controlling method of claim 1, wherein the image processing comprises a color saturation control, and the at least detail parameter comprises a color saturation gain.

8. The global spatial domain detail controlling method of claim 7, wherein the step of the image processor adjusting the at least one detail parameter corresponding to the each pixel during the image processing positive-correlatively or negative-correlatively according to the distance from the each space position of the each pixel in the image to the center of the image comprises:
    the image processor increasing a corresponding first color saturation gain if a first pixel is in a center of the image, and decreasing a corresponding second color saturation gain if a second pixel is in a corner of the image.

9. The global spatial domain detail controlling method of claim 1, wherein the image processing comprises a color interpolation control, and the at least detail parameter comprises a color interpolation threshold.

10. The global spatial domain detail controlling method of claim 9, wherein the step of the image processor adjusting the at least one detail parameter corresponding to the each pixel during the image processing positive-correlatively or negative-correlatively according to the distance from the each space position of the each pixel in the image to the center of the image comprises:
    the image processor decreasing a corresponding color interpolation threshold if a first pixel is in a center of the image, and increasing a second color interpolation threshold if a second pixel is in a corner of the image.

* * * * *